United States Patent Office 3,247,501
Patented Apr. 19, 1966

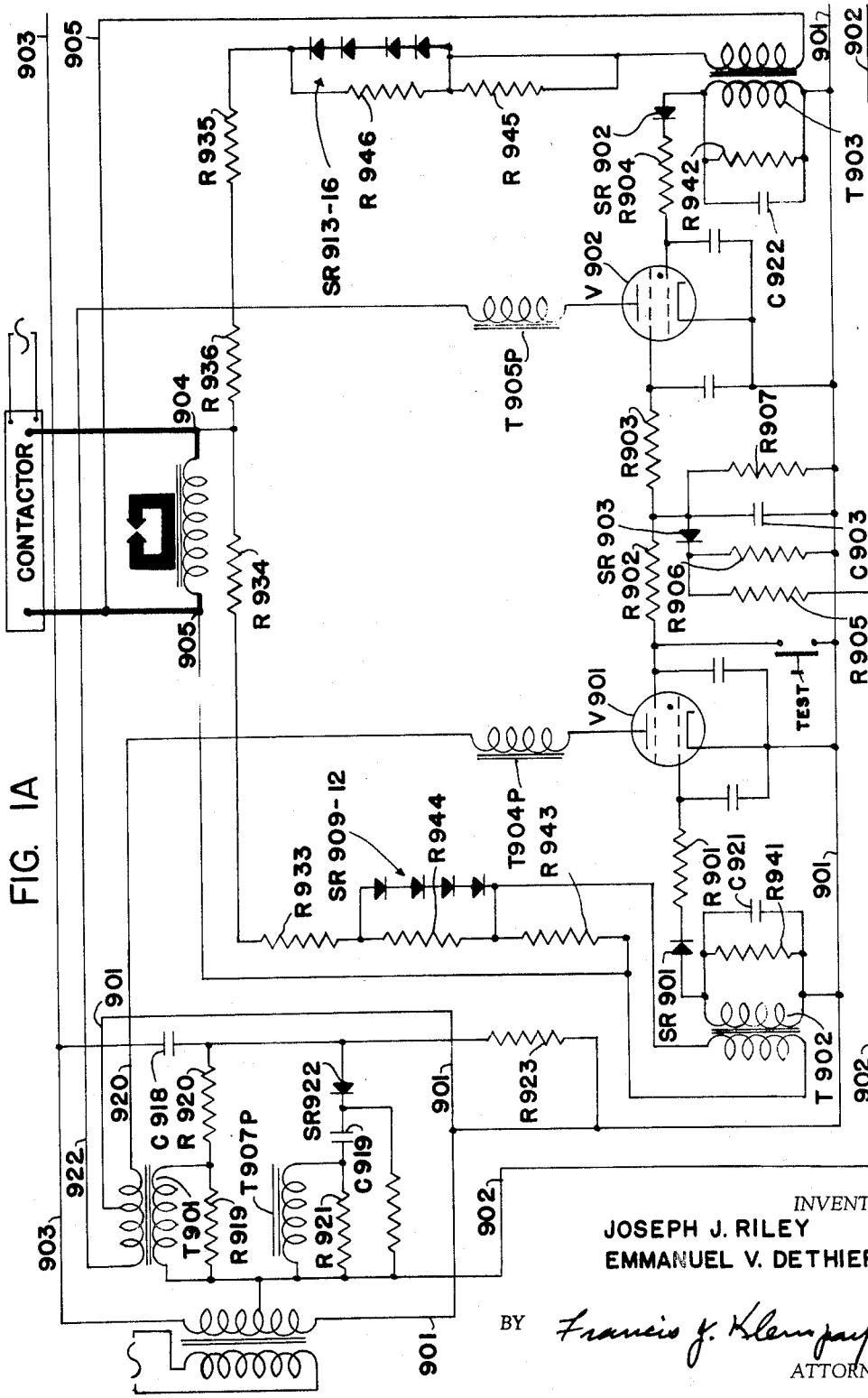
FIG. IA
INVENTORS
JOSEPH J. RILEY
EMMANUEL V. DETHIER
BY Francis J. Klempay
ATTORNEY

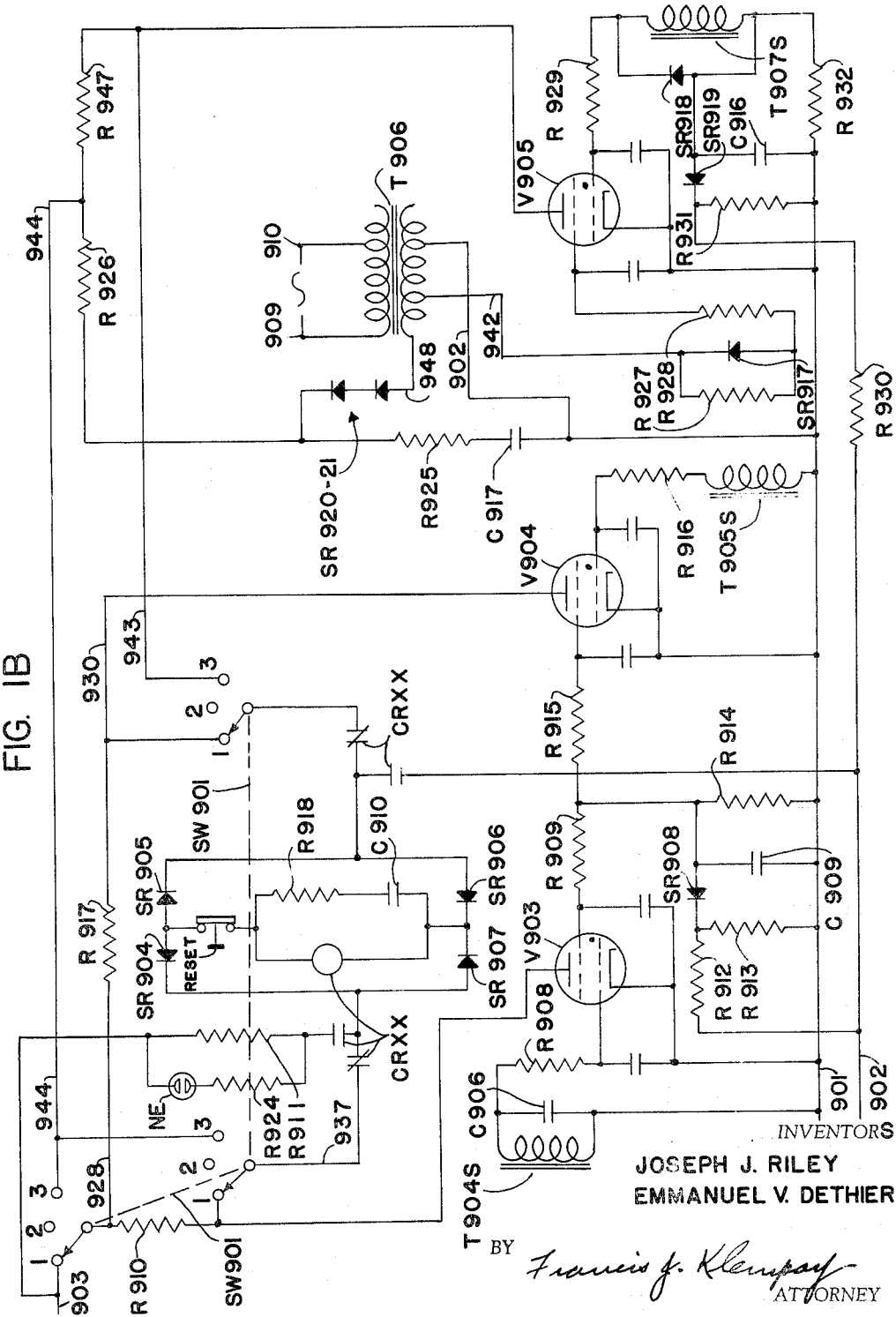

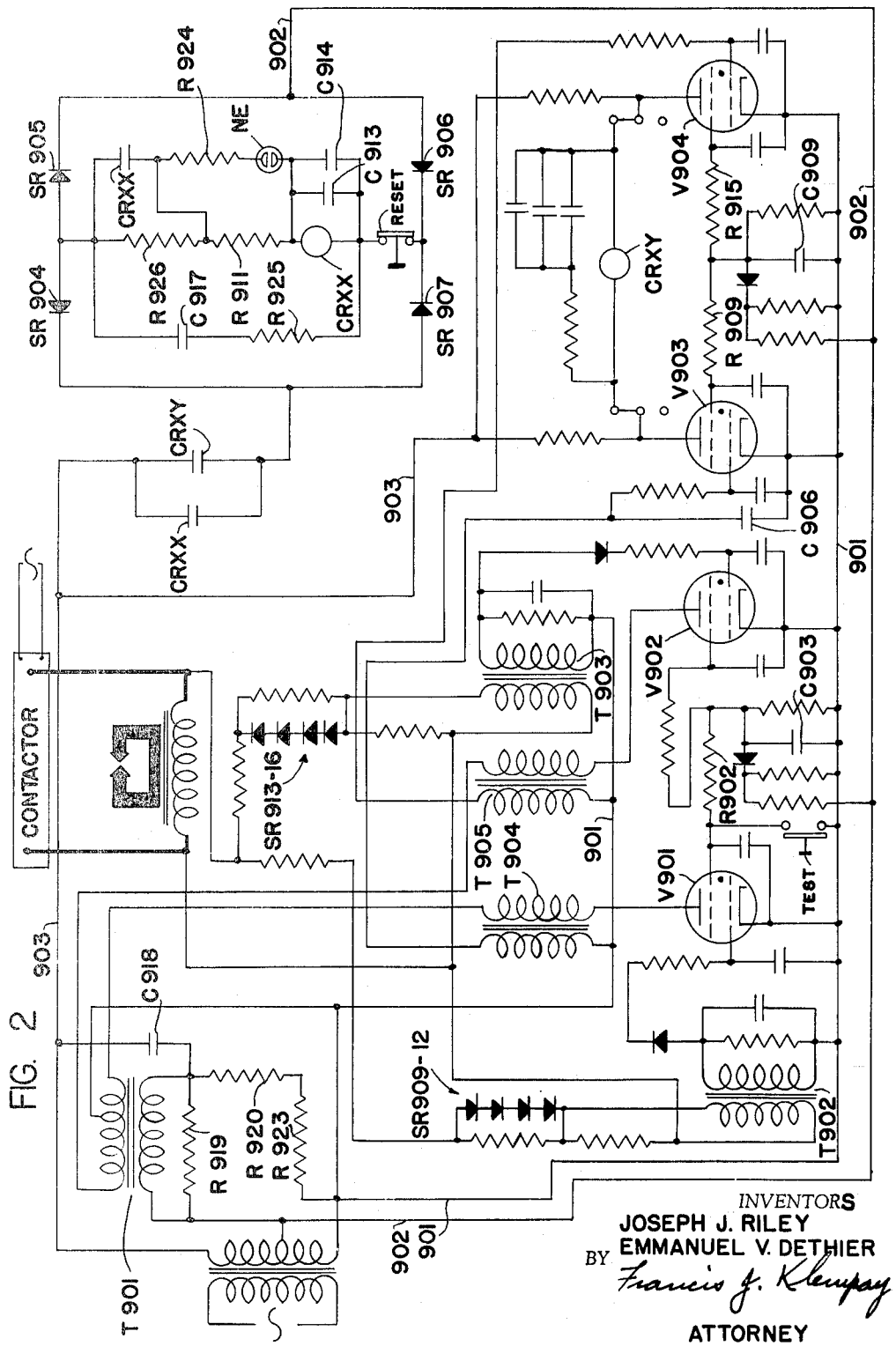

3,247,501
ELECTRIC POWER MONITORING SYSTEM PARTICULARLY FOR ELECTRIC RESISTANCE WELDERS
Joseph J. Riley and Emmanuel V. Dethier, Warren, Ohio, assignors to The Taylor-Winfield Corporation, Warren, Ohio, a corporation of Ohio
Filed Sept. 20, 1961, Ser. No. 139,420
7 Claims. (Cl. 340—253)

This invention relates to improvements in apparatus for detecting misoperation of ignitrons in alternating current power translation and control systems as used particularly in electric resistance welding systems. As is well understood by those familiar with the electric resistance welding art, the welding power transmitted varies widely as to strength, duration, and precision of total energy control to suit different welding schedules and to tailor the complexity and cost of the welding apparatus to the nature of the work at hand. Thus, in some applications only a single half cycle or a predetermined portion of a single half cycle of the welding current source may be used in a welding sequence, or alternatively full or predetermined portions of a full cycle may be translated, and in applications where a multiple number of full cycles are utilized the initiation of current flow may or may not be synchronously related to the voltage wave of the power source. Further, it is common practice in the resistance welding art to control the rate of build-up and/or decay in the welding current (slope control), and because of the electrical inertia of the welding transformer system there is always a fairly slow rate of decay of the flux in the transformer.

These various factors makes difficult the provision of any consistently reliable system for detecting the misoperation or misfiring of the ignitron or ignitrons used to control the flow of current to the welding transformer primary, and it is accordingly the primary object of the present invention to provide circuitry which will adequately cope with the characteristics and conditions encountered in the output circuit or circuits of the ignitrons—i.e. in the welding transformer primary—under all control conditions to thereby provide an ignitron misoperation detector for resistance welding apparatus which is consistently reliable in operation and highly versatile as to application.

The manner in which the above general object is accomplished by the invention, and other objects and advantages of the invention, will become apparent upon consideration of the following specification and the accompanying drawing wherein there is disclosed preferred embodiments of the invention.

In the drawing, FIGURE 1, comprised of parts 1A and 1B, on separate sheets, is a schematic showing of a resistance welding monitoring or ignitron misoperation indicating circuit which may be used in connection with either half cycle or single full cycle welding, whether or not synchronously fired and provided with heat control; and FIGURE 2 is a monitoring circuit for the same purpose which may be used with a nonsynchronous multiple cycle resistance welder control.

Referring first to FIGURE 1, the terminals 904, 905 of the resistance welding transformer is controllably supplied with alternating current from a suitable source through the "CONTACTOR" shown, which contactor includes a pair of ignitrons, not shown, connected in inverse parallel. Of course, the contactor will be provided with suitable initiating and time control means but since this equipment forms no part in the invention, it is not illustrated herein. However, sufficient resistances must be placed in the ignition circuits of the ignitrons to avoid false responses due to flow of ignition currents only. It is common practice, as in Faulk U.S. Patent No. 2,300,-538, to employ resistances in the ignition circuits for current limiting purposes. For our purpose we utilize the voltage absorbing characteristic of these resistances to limit the voltage pickup from the welding transformer primary to a very low level in the event of a misoperation so that a false indication of proper operation is not possible. Our monitoring circuit derives its signals from the welding transformer primary, and it will be readily understood by those familiar with the art that the resistance of this primary is ordinarily rather low so that only a very small fraction of the applied ignition voltage will appear across it.

Connected across the primary winding of the welding transformer is a series circuit comprised of the primary of a transformer T902, rectifiers SR909-12 and resistances R933-4. Thus, translation of a half cycle of welding current of one polarity will be detected in the secondary of transformer T902. A second and similar series circuit is connected across the welding transformer primary to detect the translation of a half cycle of welding current of the opposite polarity. This second circuit comprises the primary of transformer T903, rectifiers SR913-16, and resistances R935-6. Other resistances R943-6 are placed in these detection circuits as shown to balance them out.

To power the monitoring circuit we provide a transformer, the center-tapped secondary of which is connected to the conductors 901-3. Connected across conductors 901-2 through current limiting resistors R920 and R923 is the primary winding of a transformer T901. The center tap of the secondary of T901 is connected to conductor 901 while the end terminal of one section of this secondary is connected through conductor 920, primary winding of transformer T904P, and the anode-cathode of a gaseous discharge device V901 back to the conductor 901. The end terminal of the other section of the secondary of transformer T901 is connected to conductor 901 through the primary winding of a transformer T905P and the anode-cathode of a similar discharge device V902. The devices V901 and V902 are normally held non-conducting by a bias impressed on their screen grids by a circuit acting through resistances R902 and R903 and comprised of capacitor C903, rectifier SR903 and resistances R905-7. As shown, this circuit is powered by conductors 901 and 902. The negative screen grid bias thus furnished is, however, of insufficient strength to hold off the tubes V901-2 when strong positive potentials are supplied to the control grids of these tubes by translation of the positive and negative half cycle signals through the transformers T902-3. It should be observed at this point that the secondaries of these transformers are connected across the cathodes-control grids of tubes V901-2 through rectifiers SR901-2 and current limiting resistors R901 and R904.

Interconnecting the junction of resistance R920 and R923 with the conductor 903 is a capacitor C918 which operates to phase shift the output of transformer T901 so that the tubes V901-2 are supplied with plate voltage only near the end of the power signals received from transformers T902-3. The purpose of this arrangement is to clean and select the pickup signals coming from the welding transformer of transients and voltage kicks caused by the flow of welding current. As stated above, the signal on the control grids of tubes V901-2 is of sufficient magnitude to overcome the effect of the negative bias on the screen grids of these tubes, thereby allowing the tubes to conduct. The operation is such that tube V901 will conduct and energize transformer T904P only if a half cycle of predetermined polarity is applied to the welding transformer primary, and the tube V902 will conduct to energize transformer T905P only if a half cycle of opposite polarity is applied.

Referring now to figure section 1B, it will be observed that the secondaries of transformers T904S–5S are in the control grid circuits for gas tubes V903–4, respectively. When welding with a full cycle of current, the tubes V903–4 are energized from conductors 903, 901 through current limiting resistances R910 and R917, respectively. Tubes V903 and V904 are normally held non-conducting by a negative screen grid bias supplied through resistances R909 and R915, respectively, by a circuit powered by conductors 901 and 902 and comprised of rectifier SR908, capacitor C909, and resistances R912–4. Resistances R910 and R917 are of equal value and coincident voltage waves are supplied to the anodes-cathodes of the tubes V903–4. By employing a capacitor C906 across the secondary of signalling transformer T904S the conduction in tube V903 as a result of the translation of the first half cycle of welding current may be delayed to coincide exactly with conduction in tube V904 resulting from the translation of the last half cycle of the full cycle welding current. Connected across the anodes of the tubes V903–4 by the illustrated contacts of a manual selector switch SW901 is a balancing circuit of which the conductors 930 and 937 may be taken as the terminals. Such circuit includes normally closed contacts CRXX of an indicator relay, the operating coil of which is connected to the neutral points of a bridge-type rectifier comprised of elements SR904–7 whose input terminals are the normally closed contacts CRXX leading to conductors 930, 937.

*Full cycle operation*

It should be apparent that so long as both of the tubes V903–4 conduct simultaneously no potential will appear across the operating coil of relay CRXX and this relay will remain de-energized. However, if either of these tubes fail to conduct, a potential difference will appear across the operating coil sufficient to energize this relay and the relay will be locked in across conductors 903 and 902 through the illustrated normally open contacts of the relay. This energizing circuit includes in series the resistance R911 having connected in parallel therewith a neon indicating light NE provided with a current limiting resistor R924. By the use of suitable connected circuits, not shown, the actuation of indicator relay CRXX may be made to interrupt and/or hold off further operation of the welding machine until the monitoring circuit is reset. This latter is accomplished by manually opening the "RESETTING" switch shown in the energizing circuit for the relay.

It should be apparent from the description above that the invention provides a practical and efficient circuit for monitoring the operation of the back-to-back connected ignitrons used to control the translation of a single full cycle of power to a welding transformer. The circuit is highly discriminatory to respond only to actual power surges, is not effected by the substantial inverse voltages which are generated in the highly inductive welding transformer, and effectively screens out any transient voltages which may appear in the transformer such as, for example, those which are generated by the abrupt initiation of conduction in thyratrons placed in the ignition circuits for the ignitrons.

*Half cycle operation*

The effective monitoring of the operation of an ignitron used to repetitively translate half cycles only to a resistance welding machine has heretofore presented insuperable difficulties because of the high rate of automatic production such welders are normally subjected to and to the difficulty of screening against the myriad applied and induced voltage transients to which the welding transformer is subjected. Further problems arise from the capability of the welding equipment and the requirement of the welding process to employ half cycles of either all one polarity or of opposite polarities in successive cycles of machine operation. These various technical problems are overcome by our invention by the use of circuit arrangements now to be described.

Referring again to figure section 1B, we provide an ancillary source of direct current for the tubes V903–4 so that one or the other of these tubes may be made conductive upon the appearance of a signal at either of the screening tubes V901–2, depending on the polarity of the half cycle of welding current used. This D.C. source comprises a transformer T906 which is energized through terminals 909–10 only when the welder control operates to effect a weld. The output of transformer T906 is rectified at SR920–21 and energy is stored in capacitor C917. For half cycle operation the selector switch SW901 is moved onto contacts No. 3 so that a D.C. voltage is impressed on the anodes of tubes V903–4 through the current limiting resistor R926. Again, these tubes are normally held nonconductive by the negative screen grid bias furnished by capacitor C909 but, again, either of these tubes can be triggered on by signals appearing at transformers T904–5.

When switch SW901 is moved onto contacts No. 3, the energizing network about relay CRXX is disconnected from the plate circuits of tubes V903–4 and is connected into the plate circuit of a further gaseous tube V905. It should be noted that the tube V905 is connected across the capacitor C917 through resistances R925–6 and R947, the latter of which is parallel with the outer terminals of the balancing circuit about relay CRXX.

During the welding cycle the tube V905 is held off under all conditions by a strong negative bias applied to its screen grid from T906 thru rectifier SR917 and resistances R927–8. Its control grid is also negatively biased by potential developed from 901, 902 thru resistances R931–2, rectifier SR919 and capacitor C916. This latter bias is applied thru the secondary of a transformer T907S and resistance R929. The primary of this transformer is connected across A.C.-energized conductors 901, 902 in series with a capacitor C919 and rectifier SR922 as shown in the left portion of figure section 1A. In parallel with the secondary of T907S is a rectifier SR918 so oriented that a positive triggering signal is applied to the control grid of V905, and the strength of this signal is sufficient to overcome the normal negative bias on this grid and cause V905 to conduct after the strong negative bias is removed from the screen grid at de-energization of T906 at the end of the weld cycle. However, it should be noted that the only source of anode-cathode power for the tube V905 is the capacitor C917. If the welder operation is normal, and either tube V903 or V904 conducts, all the charge which has accumulated in capacitor C917 will, of course, be drained away through conductor 944. At the end of the weld sequence and the consequent de-energization of transformer T906, no further charging potential will be furnished the capacitor C917 and, also, the particular tube V903 or V904 which had been conducting will be extinguished. Since, during this proper operation, the tube V905 did not conduct, no potential appeared across the balancing circuit about relay CRXX, and this relay remains de-energized. During standby—i.e. between welds—the transformer T906 remains de-energized and all the tubes V901–5 remain extinguished.

If, during a welding sequence, the particular ignitron scheduled to translate the half cycle of the sequence misfires or fails to transmit its full scheduled load neither of the tubes V903 or V904 will become conductive, and at the end of weld time the charge on capacitor C917 will be available to fire the tube V905 upon the appearance of the next succeeding triggering pulse at the transformer T907. When the tube V905 conducts a potential difference will be developed across resistance R947 which upon being impressed on the outer terminals of the energizing circuit for relay CRXX through conductors 943 and 944 will cause this relay to pull in. This relay will then be locked in by its now closed normally open contacts which serve to connect its operating coil across the A.C.-powered conductors 903 and 902. As in full cycle operation, establishment of this circuit energizes the indicator NE and any other hold-off contacts, not shown, which may be a part of the relay CRXX to prevent further operation of the welding machine until the malfunctioning is corrected and the "RESET" switch actuated.

*Non-synchronous multiple cycle operation*

With the manual switch SW901 set to engage contacts Nos. 1 the circuit of FIGURE 1 is entirely operative to monitor multiple full cycle welding operations if the associated welding current control used is provided with means to initiate conduction synchronously with the voltage wave of the source and if the electric timer used to count out the number of cycles to be translated is somehow similarly synchronized. In many applications, however, such precision is not required and much more simplified controls may be employed which do not relate the initiation of conduction to the voltage wave and in which the timer set for a predetermined number of cycles may, during its timing function, span the translation of an unequal number of half cycles of this source. In such operation the apparatus of FIGURE 1 would indicate a misfire at each welding cycle or sequence. Accordingly, we have devised a system which operates generally in accordance with the principles of the FIG. 1 circuit and retains the advantages thereof while yet being consistently reliable for detecting ignitron misoperation in multiple full cycle welding non-synchronously initiated and where the power translation may span an unequal number of half cycles of the source. This system, which is illustrated in FIGURE 2, again has screening tubes V901 and V902 which conduct in response to the translation to the welding transformer of half cycle power surges of alternate polarity. Anode potential is furnished to the tubes V901 and V902 by a transformer T901 which has means in its primary circuit consisting of the resistances R919–920 and capacitor C918 to phase shift the voltages applied to the anodes of the tubes so that again conduction in these tubes will occur only toward the ends of the half cycles of conduction of the welding current. The tubes V901–2 are held normally nonconductive by a negative bias applied to their screen grids by capacitor C903, and these tubes are arranged to be triggered on by the oppositely poled control grid circuits energized from the welding transformer primary and including the transformers T902–3.

As in the embodiment of FIGURE 1, conduction in tube V901 signalling the proper translation of a half cycle of welding current of one polarity causes conduction in a tube V903 which is connected across the A.C.-energized conductors 903 and 901. Tube V903 is normally held off by a negative screen grid bias furnished by capacitor C909, and has a control grid circuit powered by a transformer T904 the primary of which is in the anode-cathode circuit of tube V901. Likewise, conduction in tube V902 results in conduction of a further tube V904 which is connected in parallel with V903. The latter is also screen-grid-biased to cutoff by capacitor C909, and has a control grid circuit including transformer T905. Again, in the biasing circuit for the control grid of tube V903 is a capacitor C906 employed to delay the firing of tube V903 until tube V904 conducts at the end of the next half cycle of welding current translated so that both tubes V903–4 will conduct at the same instant.

Connected across the anodes of tubes V903–4 is the operating coil of a relay CRXY which will be actuated only if one of the tubes V903 or V904 fails to conduct and thus if one or the other of the ignitrons is malfunctioning. In the embodiment of FIGURE 2, this first relay CRXY does not operate the connected signal or any machine disabling contacts directly but, rather, operates upon each actuation to add one count to a summation circuit. When this latter circuit receives two counts, the main indicating and/or control relay CRXX is energized in the following manner.

Deriving energy from the A.C.-energized conductors 903 and 902 through a normally open contact of the relay CRXY is a bridge rectification circuit comprised of the rectifiers SR904–7. Connected across the neutral points of the bridge is a series circuit comprised of resistances R926 and R911, the operating coil of relay CRXX, and a reset switch. In parallel with these resistances and coil is a capacitor C917 and a current limiting resistor R925 in series. Shunting the coil are capacitors C913–14, and shunting the resistance R911 is an indicator light NE and a series resistor R924. In parallel with resistance R926 is a normally open contactor of relay CRXX.

During any one period of energization of relay CRXY, capacitor C917 will be charged with one count but the relay CRXX will not be energized sufficiently to pull in because of the presence of the capacitors C913–4. If, however, a succeeding energization of relay CRXY adds a second charging pulse to the system the voltage will rise sufficiently to pull in relay CRXX to energize the neon light NE, and the relay is locked in by its normally open contactor shown in parallel with the normally open contactor of relay CRXY. As in the case of the embodiments first described, relay CRXX may be provided with machine disabling contacts, not shown, to hold off further operation of the welding machine until the ignitron misoperation is corrected.

It should be understood that the function of the cascaded relays and the counting circuit utilized in the embodiment of FIGURE 2 is to prevent the misoperation detector or indicator from being activated by the translation at the end of a welding sequence of the extra half cycle which often occurs in non-synchronous operation even though the timer calls for only full cycles. As stated above, in such cases an uneven number of half cycles are translated, and without the requirement that at least two successive ignitron misoperations be detected to actuate the indicator, the indicator would show misoperation in each such welding sequence. It is recognized that during the welding sequence misfiring in only a single half cycle will not be detected but it would be most unusual if the faulty ignitron restored itself in the next succeeding cycle, and if it did not the detector would operate.

*Testing of the monitoring circuits*

In two of the embodiments included herein we provide a "TEST" switch as illustrated which on closing removes the negative screen grid bias from the tube V901 allowing this tube to conduct. If the control is arranged for single full cycle operation the fault indicator will be energized immediately. For the non-synchronous multiple cycle setup the "TEST" switch must be actuated twice in quick succession. During these tests the welding machine is not operated nor is the welding transformer energized. For half cycle operation, the test is made by keeping the welding transformer de-energized while energizing transformer T906 through a switch, not shown, normally associated with the welder sequence control. For example T906 may be energized simultaneously with a solenoid used to control the downward movement of the welder head. In this test the tube V905 will fire and the fault indicating circuit (relay CRXX) in FIGURE 1 will be energized.

*Summary*

It should now be apparent that we have provided improved ignitron misoperation monitoring circuits particularly for electric resistance welders which accomplishes the objects initially set out. The invention is highly versatile in that it may be readily adapted to a wide variety of resistance welding processes, and the invention is consistently reliable in use since its screening and/or selectivity characteristics overcomes the problems heretofore encountered in monitoring ignitrons connected to a highly inductive load such as a resistance welding transformer. Of practical importance in the resistance welding field is the fact that the monitoring circuit of our invention is completely reliable in operation even though the welding current control with which it is used is capable of a very wide range of heat control—for example, from 100% down to 20% of maximum available energy. This characteristic also places no limitation on the use of control circuits to control the rate of buildup and decay of welding current (slope control) which is highly desirable in some resistance welding applications.

Having thus described our invention what we claim as new is:

1. In apparatus for monitoring the operation of ignitrons used to control the translation of alternating current to an inductive load such as a resistance welding transformer and wherein a signal is employed to indicate misoperation of an ignitron the improvement comprising a circuit connected to the input terminals of the load operative to generate an electrical pulse near the end of each half cycle of power applied to the load, separate circuit means to establish two electrical potentials individually in response to the electrical pulses generated by the translation of half cycle power increments of opposite polarity, means to delay the establishment of one of said potentials whereby normally during each full cycle of power translation said potentials are established simultaneously, a balancing network interconnected between said potential points, and means operative upon the appearance of an unbalance in said network to actuate said signal.

2. Apparatus according to claim 1 further characterized in that said means to generate electrical pulses comprises a pair of electrical discharge devices and an energizing circuit therefor comprising first a source of alternating voltage synchronous with the alternating voltage of the power source and secondly phase shifting means to render the anodes of said devices positive only during the last stages of the positive and negative half cycles of power applied to said load.

3. Apparatus according to claim 2 further characterized in that each of said devices is normally nonconducting and is provided with a control grid, a separate circuit for each of said control grids having means to generate a positive bias on the grid from the potential developed across said load at each half cycle of power conduction, each of said last named separate circuits including a rectifier and the rectifiers in said last named separate circuits being oppositely oriented whereby one of said devices will respond to positive half cycle power translations while the other of said devices will respond to negative half cycle power translations.

4. In apparatus for monitoring the operation of ignitrons used to control the tranlation of alternating current to an inductive load such as a resistance welding transformer and wherein a signal is employed to indicate misoperation of an ignitron the improvement comprising means connected with the input terminals of said load to generate an electrical impulse near the end of any half cycle power translation to said load, and means responsive to the nonappearance of said impulse to actuate said signal.

5. In apparatus for monitoring the operation of ignitrons used to control the translation of alternating current to an inductive load such as a resistance welding transformer and wherein a signal is employed to indicate misoperation of an ignitron, the improvement comprising separate circuits to generate electrical impulses in response to the translation of positive and negative half cycles of power, respectively, to said load, a capacitor, means operable synchronously with said half cycle translations to charge said capacitor, means operative in response to either of said electrical impulses to discharge said capacitor, and means operative at the end of each of said translations and powered by said capacitor to actuate said signal.

6. In apparatus for monitoring the operation of ignitrons used to control the translation of alternating current to an inductive load such as a resistance welding transformer and wherein a signal is employed to indicate misoperation of an ignitron, the improvement comprising separate circuits to generate electrical impulses in response to the translation of positive and negative half cycles of power, respectively, to said load, separate circuit means to establish two electrical potentials individually in response to the electrical pulses generated by the translation of half cycle power increments of opposite polarity, means to delay the establishment of one of said potentials whereby normally during each full cycle of power translation said potentials are established simultaneously, a balancing network interconnected between said two potentials, means operative upon the appearance of an unbalance in said network to create an electrical counting pulse, and means operative upon the creation of a predetermined number of said counting pulses to actuate said signal.

7. In apparatus for monitoring the operation of ignitrons used to control the translation of alternating current to an inductive load such as a resistance welding transformer and wherein a signal is employed to indicate misoperation of an ignitron, the improvement comprising a circuit connected to the input terminals of the load operative to generate an electrical pulse near the end of each half cycle of power applied to the load, separate circuit means to establish two electrical potentials individually in response to the electrical pulses generated by the translation of half cycle power increments of opposite polarity, means to delay the establishment of one of said potentials whereby normally during each full cycle of power translation said potentials are established simultaneously, a balancing network interconnected between said two potentials, means operative upon the appearance of an unbalance in said network to create a counting pulse, and means operative upon the appearance of a predetermined number of counting pulses during successive half cycles of power translated to said load to actuate said signal.

References Cited by the Examiner

UNITED STATES PATENTS

| 2,130,411 | 9/1938 | Bedford | 340—248 |
| 2,384,647 | 9/1945 | Schwarschild | 317—142 |
| 2,433,371 | 12/1947 | Klemperer | 340—253 X |
| 2,438,742 | 3/1948 | Farrow | 340—253 X |
| 2,516,011 | 7/1950 | Marsh et al. | 315—129 |
| 2,574,374 | 11/1951 | Bivens. | |
| 2,680,212 | 6/1954 | Frazier | 340—253 X |

NEIL C. READ, *Primary Examiner.*